(12) United States Patent
Jurgenowski et al.

(10) Patent No.: US 10,683,013 B2
(45) Date of Patent: Jun. 16, 2020

(54) RESETTING CONTROLLER SETTINGS IN A MOTOR VEHICLE

(71) Applicant: AUDI AG, Ingolstadt (DE)

(72) Inventors: Boris Jurgenowski, Ingolstadt (DE); Martin Tomenendal, Beilngries (DE)

(73) Assignee: AUDI AG, Ingolstadt (DE)

( * ) Notice: Subject to any disclaimer, the term of this patent is extended or adjusted under 35 U.S.C. 154(b) by 109 days.

(21) Appl. No.: 16/078,460

(22) PCT Filed: Mar. 31, 2017

(86) PCT No.: PCT/EP2017/057648
§ 371 (c)(1),
(2) Date: Aug. 21, 2018

(87) PCT Pub. No.: WO2017/182252
PCT Pub. Date: Oct. 26, 2017

(65) Prior Publication Data
US 2019/0337527 A1 Nov. 7, 2019

(30) Foreign Application Priority Data

Apr. 23, 2016 (DE) .................. 10 2016 004 963

(51) Int. Cl.
B60W 50/08 (2020.01)
G05B 15/02 (2006.01)
G06Q 30/06 (2012.01)

(52) U.S. Cl.
CPC ............. *B60W 50/08* (2013.01); *G05B 15/02* (2013.01); *G06Q 30/0645* (2013.01)

(58) Field of Classification Search
CPC .... B60W 50/08; G05D 15/02; G06Q 30/0645
USPC ............................................. 701/36
See application file for complete search history.

(56) References Cited

U.S. PATENT DOCUMENTS

| 6,718,240 B1 | 4/2004 | Suda et al. |
| 9,238,450 B1 | 1/2016 | Kleve et al. |
| 2015/0197205 A1 | 7/2015 | Xiong et al. |

(Continued)

FOREIGN PATENT DOCUMENTS

| DE | 10 2008 046 279 A1 | 7/2009 | |
| DE | 10 2012 012 635 A1 | 1/2013 | |
| DE | 102012012635 A1 * | 1/2013 | ........... B60R 16/037 |

(Continued)

OTHER PUBLICATIONS

German Office Action dated Apr. 3, 2017 from German Patent Application No. 10 2016 004 963.4, 12 pages.

(Continued)

*Primary Examiner* — Gertrude Arthur Jeanglaude
(74) *Attorney, Agent, or Firm* — Staas & Halsey LLP

(57) ABSTRACT

A resetting device for at least one controller in a motor vehicle includes a receiving unit for receiving a reset signal, and a resetting unit for resetting at least one setting of the controller to a predefined reset setting following the receipt of the reset signal by the receiving unit. The setting of the controller can be modified by the user of the motor vehicle during proper use of the motor vehicle, and the receiving unit is designed for the wire-free reception of the predefined reset setting from a computing unit that is external to the vehicle, in order to increase the quality of service in a motor vehicle.

17 Claims, 1 Drawing Sheet

(56) References Cited

U.S. PATENT DOCUMENTS

2015/0210287 A1    7/2015  Penilla et al.

FOREIGN PATENT DOCUMENTS

| DE | 10 2012 224 194 A1 | 6/2014 |
| DE | 10 2012 024 635 A1 | 7/2014 |
| DE | 10 2015 114 684 A1 | 3/2016 |
| DE | 10 2016 004 963.4 | 4/2016 |
| WO | 2014/158766 A1 | 10/2014 |
| WO | PCT/EP2017/057648 | 3/2017 |

OTHER PUBLICATIONS

International Search Report dated Jun. 19, 2017 from International Patent Application No. PCT/EP2017/057648, 3 pages.
English translation of the International Preliminary Report on Patentability dated Oct. 25, 2018 from International Patent Application No. PCT/EP2017/057648, 7 pages.
European Office Action dated Nov. 20, 2018 from European Registration No. 17 718 836.4, 11 pages.

\* cited by examiner

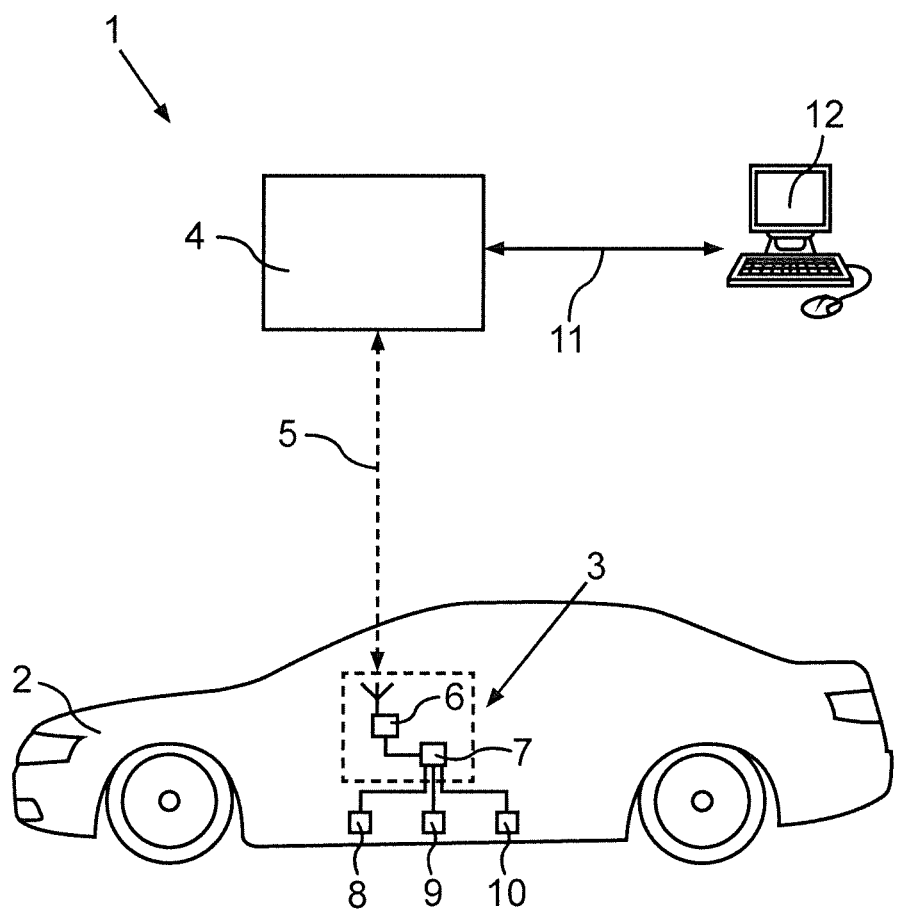

RESETTING CONTROLLER SETTINGS IN A MOTOR VEHICLE

CROSS REFERENCE TO RELATED APPLICATIONS

This application is a U.S. national stage of International Application No. PCT/EP2017/057648, filed on Mar. 31, 2017. The International Application claims the priority benefit of German Application No. 10 2016 004 963.4 filed on Apr. 23, 2016. Both the International Application and the German Application are incorporated by reference herein in their entirety.

BACKGROUND

Described herein is a resetting device for at least one controller in a motor vehicle having a reception unit for receiving a reset signal and a resetting unit for resetting at least one setting of the controller to a prescribed reset setting after reception of the reset signal by the reception unit, wherein the resettable setting of the controller is modifiable by a user of the motor vehicle when the motor vehicle is used as intended. Also described herein is a corresponding method for resetting a setting of at least one controller of at least one motor vehicle.

Usually, rental cars, fleet vehicles or carsharing vehicles are cleaned after customer use and, by way of example, equipped with informative material such as flyers for a (mobility) provider. Today's and future vehicles have hundreds of settings that can be individually set or modified by the user when using the motor vehicle. These include, by way of example, the settings for seats, the settings for an air conditioning system and the settings in a navigation appliance. After a customer use, it is then possible, today, for settings in accordance with a company philosophy of the provider, for example, to be reset or else for settings to be erased on the basis of legal data protection considerations manually by employees of the provider only with a very high level of outlay. Thus, settings such as ergonomic settings or an electronic fingerprint from the previous users can often be found in a rental car or the like today. An insight into the privacy of the previous user is also often gained, for example if destinations previously input in a navigation system have not been erased.

The customer of the provider or mobility provider therefore does not find the motor vehicles in a reasoned and standard state defined by the provider. This results in great quality of service losses. By way of example, a previous user may have stored in a navigation system that freeways need to be avoided during route guidance, which the current customer possibly does not notice until it is too late.

In this connection, German Patent Application Publication 10 2012 024 635 A1 describes a resetting apparatus for a motor vehicle that is configured to be in a vehicle and is connected to a vehicle network. The vehicle network likewise has at least two electronic loads connected to it, these being able to be reset to a defined logical state by using the resetting apparatus.

U.S. Pat. No. 6,718,240 B1 describes a keyless entry system for a motor vehicle in which a key fob can be changed over between a guest mode and a driver mode and applicable settings stored in the vehicle are activated for the guest or the driver.

U.S. Pat. No. 9,238,450 B1 describes a vehicle having a multiplicity of settings able to be made by a user that are able to be reset to a factory setting stored in the vehicle by using a remote control signal.

SUMMARY

An aspect of the disclosure is therefore that of increasing the quality of service in a motor vehicle, for example a motor vehicle used for mobility services.

Described herein is a resetting device for at least one, for example multiple or a plurality of, controller(s) in a motor vehicle. In this case, the resetting device may be coupled to the controller or controllers via a vehicle network. The resetting device has a reception unit for receiving a reset signal (from outside the motor vehicle). The reception can also be effected wirelessly in this case. The resetting device likewise has a resetting unit for resetting at least one setting of the controller or controllers to a prescribed setting after reception of the reset signal by the reception unit. The reset setting may thus be a reset setting that is prescribable (externally to the vehicle). In this case, the setting of the controller is modifiable or adjustable by a user of the motor vehicle when the motor vehicle is used as intended. The settings resettable by the resetting unit may thus be a user setting.

A fundamental aspect in this case is that the reception unit is designed for wirelessly receiving the prescribed reset setting from a vehicle-external computation unit. The reset setting to which the controller or the setting of the controller can be reset is thus held externally to the vehicle, for example in what is known as a backend, a far remote computation unit that may even be outside a visual range or at a long distance of, by way of example, hundreds of kilometers.

This has the advantage that the reset setting is individually adaptable and is not statically coded in the vehicle, as is the case with a factory setting, for example. Therefore, the individual adaptation of the reset setting requires no adaptation on the mass-produced vehicle or during production of the mass-produced vehicle. The specific individual reset setting is thus introduced remotely. This has the advantage that the motor vehicle associated with the controller can be reset to any reset setting, individually prescribable on the vehicle-external computation unit, in situ with little outlay without an operator, for example an employee of a mobility provider. Since it is thus possible for even human errors, such as, for example, omitting to reset settings such as erasing destinations input in a navigation appliance by previous users or other settings made by a user, to be precluded, it is thus possible for a standard state of the motor vehicle or a standard setting of the controllers coupled to the resetting device in the motor vehicle to be ensured and an improved quality of service to be achieved. It is thus possible for a rental, fleet or carsharing vehicle to be reset to the desired state again after return, for example.

In an advantageous embodiment, there is provision for the reception unit to be designed to receive the prescribed reset setting and/or the reset signal via a wireless network. For example, this can be effected via a mobile radio network and/or a wireless local area network (WLAN). Further established data connections, for example what is known as e-Call or other services such as connect services available in the vehicle, can also be used here for transmitting the reset setting. Transmission via a network affords the advantage that a reset setting or multiple reset settings can be transmitted to a multiplicity of motor vehicles having such a resetting device without a high level of outlay. Moreover, the networks can also be linked to the Internet particularly easily, so that, by way of example, the vehicle-external computation unit can be reached by the reception unit via the Internet or, conversely, the owner of the motor vehicle, for example a mobility provider, can access the vehicle-external computation unit via the Internet and can thus activate the resetting unit and set the settings of the controller or controllers to the reset setting or reset settings.

There may be provision for the at least one controller to have at least one adjustable parameter, for example adjustable by the user of the motor vehicle when the motor vehicle is used as intended. A setting of the controller or controllers can relate to one or more parameters in each case.

In a further embodiment, there is provision for the at least one controller to include one or more of the following controllers: a controller of a seat system and/or of an interior lighting, for example for a coloration of the interior lighting, and/or of a navigation system and/or of a radio and/or of an infotainment system and/or of a combination instrument and/or of an exterior lighting and/or of an air conditioning system and/or of a driver assistance system, for example for a driving dynamics setting. The reset setting or the setting of the controller or controllers reset by the resetting unit can thus include a (reset) setting for a seat system and/or for an interior lighting, for example a setting for a coloration of the interior lighting, and/or for a navigation system, for example a destination and/or road preference setting made in the navigation system, and/or for a radio and/or for an infotainment system and/or for a combination instrument and/or for an exterior lighting and/or for an air conditioning system, for example for a temperature setting made in the air conditioning system, and/or for a driver assistance system, for example for a driving dynamics setting. The controller may thus for example be a controller for an ergonomic setting, and the applicable (reset) setting may be an ergonomic setting. Since the settings may be altered frequently by users, the resultant advantage in this case is a perceptible increase in the quality of service as a result of a standard individually prescribable impression of the motor vehicle, which can be produced with little personnel outlay.

In another advantageous embodiment, there is provision for the resetting unit to be designed to reset the setting to the reset setting only if the reset setting is also received with the reset signal. This has the advantage that it is thus a simple matter to ensure that a desired reset setting is always used. Moreover, it is thus possible for a central memory in the resetting device for storing the reset setting to be dispensed with, which results in the resetting device being able to be integrated into mass-produced vehicles with a particularly low level of implementation outlay.

In another embodiment, there is provision for the resetting device also to include a memory unit designed to store the reset setting received by the reception unit. This has the advantage that a received reset setting can be compared with the stored reset setting and thus an error correction can be performed if need be. In addition, in the event of an alteration of the reset setting in comparison with the stored reset setting, it is also possible for fresh confirmation to be requested. Moreover, it may thus not be necessary for the reset setting to be transmitted from the vehicle external computation unit to the reception unit on every reset, which can be advantageous in areas with poor mobile radio reception, for example.

In a further embodiment, there is provision for the resetting device to be designed to reset the setting of the controller only when the motor vehicle is in a prescribed state. For example, the prescribed state can include the motor vehicle being parked and/or no user being in the motor vehicle and/or the motor vehicle being at a prescribed location. This has the advantage that erroneous or possibly dangerous resetting of the setting of the controller, for example in critical situations, is avoided.

Also described herein is a motor vehicle having a resetting device as described herein.

Also described herein is a resetting system having the resetting device or having a motor vehicle provided with such a resetting device and having a vehicle-external computation unit. In this case, the vehicle-external computation unit can include a computation server. For example, the vehicle external computation unit is controllable via the Internet.

Also described herein is a fleet resetting system having more than one motor vehicle having the resetting device and having the vehicle-external computation unit. This has the advantage that the operator of the fleet is rendered able to continually provide a standard state of the rental, fleet or carsharing vehicles with a low level of personnel outlay. Depending on the vehicle features and the controllers coupled to the resetting device, it is thus also possible for corporate design features of the mobility provider to be introduced into the vehicle. Thus, by way of example, it is possible for a color of the interior lighting to be matched to a corporate design of the respective mobility provider. A predefined standard state also results in familiarization phases for a user when the applicable vehicle is accepted from a mobility provider being shortened. The mobility provider can thus configure its vehicle pool according to the individual desires in accordance with the philosophy of the mobility provider and can thus prescribe one or more settings of one or more controllers of the motor vehicles as its own, individual standard.

Also described herein is a method for resetting a setting or multiple settings of at least one controller of at least one motor vehicle with a series of operations. One of these operations is wirelessly receiving a prescribed reset setting from a vehicle-external computation unit by using a reception unit. The prescribed reset setting or the prescribed reset settings can therefore be wirelessly transmitted from the vehicle-external computation unit to the reception unit. The prescribed reset setting is stored on the vehicle-external computation unit in this case and can be modified there. A further operation is receiving a reset signal by using the reception unit. A next operation is resetting at least one setting of the controller to the received reset setting, wherein the setting of the controller is adjustable by a user of the motor vehicle when the motor vehicle is used as intended.

Advantages and advantageous embodiments of the method are similarly applicable in this case with advantages and advantageous embodiments of the resetting device or the resetting system or fleet resetting system.

The features and combinations of features described in the description above, and the features and combinations of features described in the description of the drawing below and/or shown in the drawing alone, can be used not only in the respectively indicated combination but also in other combinations without departing from the scope of the disclosure. Therefore, embodiments not explicitly shown and explained in the drawing, but which emanate and are producible from the explained embodiments by virtue of separate combinations of features, are also intended to be regarded as included and disclosed.

BRIEF DESCRIPTION OF THE DRAWING

These and other aspects and advantages will become more apparent and more readily appreciated from the following description of example embodiments, taken in conjunction with the accompanying single drawing, of which:

An example embodiment of in the single drawing is a resetting system, according to an example.

DETAILED DESCRIPTION OF THE PREFERRED EMBODIMENT

Reference will now be made in detail to example embodiments which are illustrated in the accompanying drawing, wherein like reference numerals refer to like elements throughout.

In the single drawing, the resetting system 1 includes a motor vehicle 2 having a resetting device 3 coupled to a vehicle-external computation unit 4. In the example, the coupling is made via a wireless network 5, for example a mobile radio link.

In the example shown, the resetting device 3 includes a reception unit 6, which can also be referred to as what is known as a "connected gateway", for example. Further, the resetting device 3 also includes a resetting unit 7 coupled to a controller, in the example multiple controllers 8, 9, 10. In the example, the vehicle-external computation unit 4, which may be realized in Audi's own modular backend construction kit, for example, is for its part coupled to a user interface 12, for example a PC, via a data connection, for example an Internet connection 11.

In the example shown, an operator, for example a mobility provider, can now use the user interface 12 to trigger a reset of settings of the different controllers 8, 9, 10 by transmitting a reset signal from the vehicle-external computation unit 4 to the resetting device 3. In this case, the reception unit 6 receives the reset signal and—for example together with the reset signal—a prescribed or prescribable reset setting, and the resetting unit 7 prompts a reset of at least one setting, in the example multiple settings, to the prescribed reset setting or reset settings.

It is thus possible, by way of example, for the first controller 8 to be associated with a seat system and for the reset setting to match the seat to an average driver height again. By way of example, the second controller 9 could also be the controller of an interior lighting, for which the reset setting prescribes a particular shade or coloration in accordance with the requirements of the mobility provider or of the user. The third controller 10 may be the controller of a navigation system, for example, for which the reset setting prescribes the return point as the original location or home location ("home"), for example.

The individualized reset setting or, in the example, the reset settings are stored in the vehicle-external computation unit 4 in this case and can thus be modified and hence prescribed conveniently, and in this case also for many motor vehicles at the same time, via the user interface 12. The reset setting prescribable by the user and then prescribed can be transmitted to the resetting device 3 together with the reset signal. Since the reset setting is stored centrally, it is thus also readily possible for any-sized fleets of motor vehicles to be reset to the individually prescribable reset settings under central control without a person in situ needing to work on the motor vehicle 2 and the further motor vehicles. Alternatively or additionally, the prescribed reset setting can also be stored in the resetting device 3.

A description has been provided with particular reference to various examples, but it will be understood that variations and modifications can be effected within the spirit and scope of the claims which may include the phrase "at least one of A, B and C" as an alternative expression that means one or more of A, B and C may be used, contrary to the holding in *Superguide* v. DIRECTV, 358 F3d 870, 69 USPQ2d 1865 (Fed. Cir. 2004).

The invention claimed is:

1. A resetting device for at least one controller in a motor vehicle, the resetting device comprising:
   a receiver to wirelessly receive a reset signal together with a prescribed reset setting from a vehicle-external computer, the prescribed reset setting having been prescribed at the vehicle-external computer; and
   a resetting unit, comprising a processor, to reset at least one setting of the at least one controller to the prescribed reset setting after reception of the reset signal by the receiver, the setting of the at least one controller being modifiable by a user of the motor vehicle when the motor vehicle is used as intended.

2. The resetting device as claimed in claim 1, wherein the receiver is configured to receive at least one of the prescribed reset setting or the reset signal via a wireless network.

3. The resetting device as claimed in claim 1, wherein the wireless network includes at least one of a mobile radio network or a wireless local area network.

4. The resetting device as claimed in claim 1, wherein the at least one controller has at least one adjustable parameter and includes one or more of a controller of a seat system, a controller of an interior lighting system, a controller of a navigation system, a controller of a radio, a controller of an infotainment system, a controller of a combination instrument, a controller of an exterior lighting system, a controller of an air conditioning system, or a controller of a driver assistance system.

5. The resetting device as claimed in claim 4, wherein the controller of the interior lighting system controls a coloration of the interior lighting, and the controller of the driving assistance system controls a driver dynamics setting.

6. The resetting device as claimed in claim 1, wherein the resetting unit is configured to reset the at least one setting of the at least one controller to the prescribed reset setting only if the prescribed reset setting is received together with the reset signal.

7. The resetting device as claimed in claim 1, wherein the resetting device further comprises a memory configured to store the prescribed reset setting received by the receiver.

8. The resetting device as claimed in claim 1, wherein the resetting device is configured to reset the at least one setting of the at least one controller only if the motor vehicle is in a prescribed state.

9. The resetting device as claimed in claim 8, wherein the prescribed state includes at least one of when the motor vehicle is in a parked state, when there is no user in the motor vehicle, or when the motor vehicle is at a prescribed location.

10. A motor vehicle having the resetting device of claim 1.

11. A resetting system, comprising:
   a vehicle-external computer to store a prescribed reset setting which is prescribed at the vehicle-external computation unit; and
   a motor vehicle including:
      a chassis,
      a controller having a setting modifiable by a user of the motor vehicle when the motor vehicle is used as intended, and
      a resetting device, including:

a receiver to wirelessly receive a reset signal together with the prescribed reset setting from the vehicle-external computer, and a resetting unit, comprising a processor, to reset the setting of the controller to the prescribed reset setting after reception of the reset signal by the receiver.

12. The resetting system of claim 11, wherein the resetting system includes a plurality of motor vehicles, each of the plurality of motor vehicles includes the resetting device, and each of the motor vehicles belong to a same vehicle fleet.

13. A method for resetting a setting of at least one controller of at least one motor vehicle, comprising:

wirelessly receiving, by a receiver from a vehicle-external computer, a reset signal together with a prescribed reset setting, the prescribed reset setting having been prescribed at the vehicle-external computer; and resetting at least one setting of the at least one controller to the received prescribed reset setting, the at least one setting of the controller being adjustable by a user of the motor vehicle when the motor vehicle is used as intended.

14. The method of claim 13, wherein the resetting of the at least one setting of the at least one controller is performed only if the motor vehicle is in a prescribed state.

15. The method of claim 14, wherein the prescribed state includes at least one of when the motor vehicle is in a parked state, when there is no user in the motor vehicle, or when the motor vehicle is at a prescribed location.

16. The method of claim 13, further comprising storing, in a memory of a resetting device installed in the motor vehicle, the prescribed reset setting.

17. The method of claim 13, further comprising:

comparing the prescribed reset setting received by the receiver from the vehicle-external computer with a reset setting stored in a memory of the motor vehicle; and requesting a confirmation from the vehicle-external computer to change the reset setting stored in the memory of the motor vehicle when the comparing indicates the prescribed reset setting received by the receiver from the vehicle-external computer is different from the reset setting stored in the memory of the motor vehicle.

* * * * *